United States Patent [19]

Lamprey

[11] 4,274,023
[45] Jun. 16, 1981

[54] COMPACT VARIABLE SPEED DRIVE FOR ELECTRIC MOTOR

[76] Inventor: Donald F. Lamprey, 114 Glenwood Dr., Liverpool, N.Y. 13088

[21] Appl. No.: 37,682

[22] Filed: May 10, 1979

[51] Int. Cl.³ .............................................. H02K 7/10
[52] U.S. Cl. ...................................... 310/83; 74/789
[58] Field of Search ............ 310/80, 83, 258, 115–117, 310/267, 41; 74/789

[56] References Cited

U.S. PATENT DOCUMENTS

| 1,819,606 | 8/1931 | Jones | 74/789 |
| 2,600,762 | 6/1952 | Hartz | 74/789 |
| 3,374,372 | 3/1968 | Tinder | 310/83 |
| 3,533,484 | 10/1970 | Wood | 310/83 |
| 4,021,690 | 5/1977 | Burton | 310/83 |
| 4,185,215 | 1/1980 | Montagu | 310/83 |

FOREIGN PATENT DOCUMENTS

| 370229 | 9/1917 | Fed. Rep. of Germany | 310/83 |
| 2005047 | 8/1971 | Fed. Rep. of Germany | 310/83 |
| 2719413 | 11/1977 | Fed. Rep. of Germany | 310/83 |

Primary Examiner—R. Skudy
Attorney, Agent, or Firm—Bruns & Jenney

[57] ABSTRACT

An electrical machine in which a frame supporting the rotor windings is coupled to the machine shaft through a planetary gear system housed within the rotor structure. The internal ring gear of the planetary system forms a part of the motor rotor structure. Further locking devices are provided to lock the various movable components making up the drive system together or to the motor casing so that a variety of speeds can be selectively attained at the output shaft or shafts of the motor without changing the motor speed.

4 Claims, 7 Drawing Figures

COMPACT VARIABLE SPEED DRIVE FOR ELECTRIC MOTOR

BACKGROUND OF THE INVENTION

This invention relates to electric machinery and, in particular, to a compact drive system suitable for use in an electric machine.

More specifically, this invention relates to a rotor assembly for use in an electric machine such as a motor or the like. Typically the rotor section of an electric motor consists of a frame mounted armature, a rotatably mounted central shaft and means to rigidly connect the shaft to the rotor frame. Oftentimes the radial distance between the shaft and the frame is comparatively large and, except for the connection therebetween, contains a good deal of unused space. In the case of fractional horsepower motors, where the available space for both the motor and its associated drive system is limited, the space between the shaft and the rotor frame represents a relatively large part of the total available space.

As disclosed in U.S. Pat. No. 613,894, the drive or transmission section of an electric motor is generally situated some distance to one side of the motor windings and is enclosed either within the motor housing itself or within a separate transmission housing. Because the size of the motor is usually fixed, efforts to reduce the size of the system usually are centered about compacting the size of the transmission. However, a point is soon reached where no further advantage can be gained in this regard. As will be disclosed below, the present invention is dedicated toward bringing the transmission or drive system of a motor within the confines of the rotor section of the motor to provide a truly compact motor and drive assembly.

SUMMARY OF THE INVENTION

It is therefore an object of the present invention to improve electric machinery.

A further object of the present invention is to effectively utilize what has heretofore been considered unusable space in an electric motor and drive combination.

Another object of the invention is to provide for a more compact structure for coupling an electrical motor to a transmission.

Yet another object of this invention is to locate the transmission of an electric machine within the confines of the rotor windings.

A still further object of the present invention is to mechanically connect the rotor windings of an electric machine to the rotor shaft through means of a gear system.

These and other objects of the present invention are attained by means of an electric machine having a stator mounted within a housing, rotor windings mounted upon a frame and being positioned for rotation within the stator, a rotor shaft axially aligned within the rotor frame, and a planetary gear system connecting the rotor frame to the rotor shaft. Further means are also provided to control the motion of selected gears to produce a number of different output speeds at the shaft for a given rotor speed.

BRIEF DESCRIPTION OF THE DRAWINGS

For a better understanding of these and other objects of the present invention reference is had to the following detailed description of the invention which is to be read in conjunction with the following drawings wherein.

DESCRIPTION OF THE INVENTION

Figure 1:
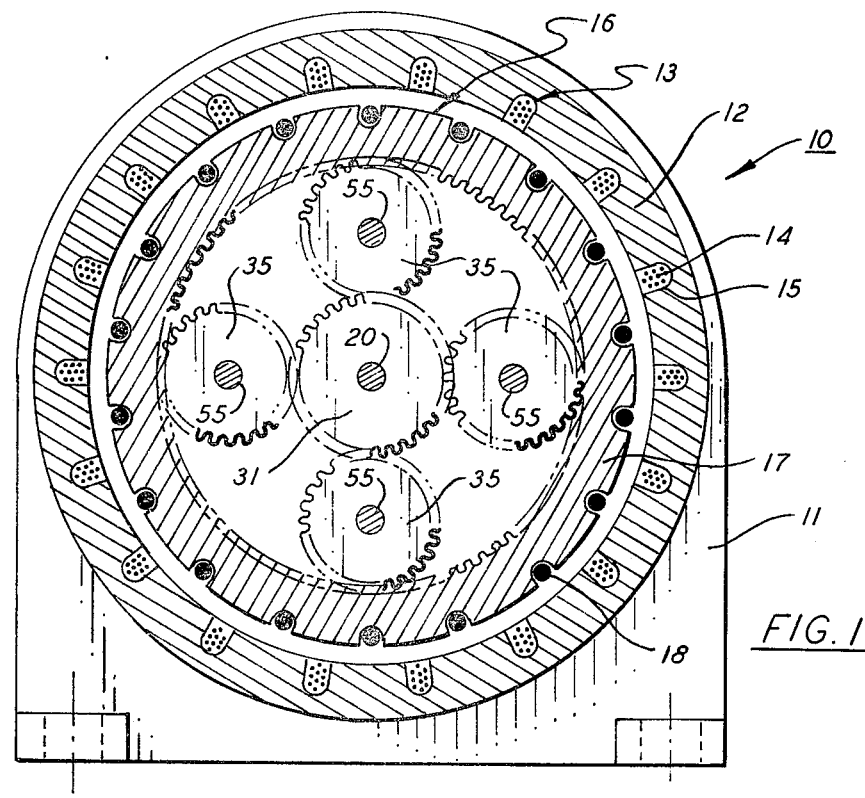
FIG. 1 is a side elevation in section of an electric machine embodying the teachings of the present invention.
Figure 2:
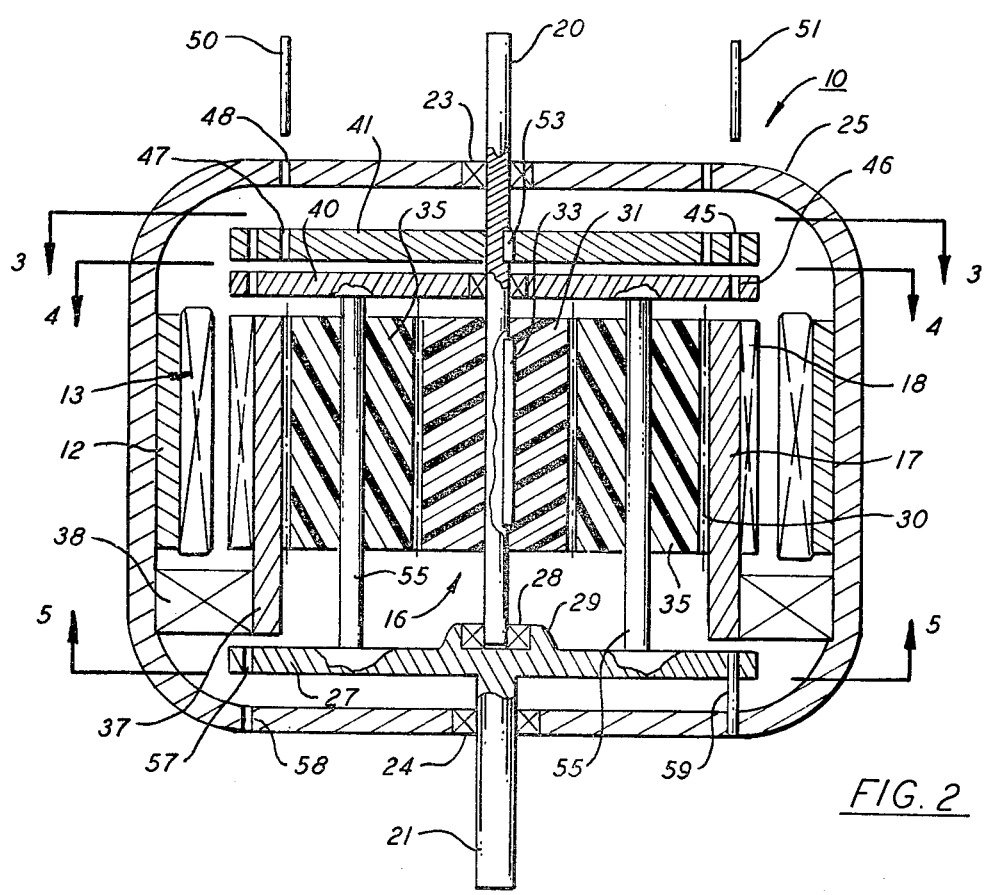
FIG. 2 is a sectional plan view of the motor of FIG. 1 taken along the axis of rotation of the machine.

Referring initially to FIGS. 1 and 2, there is shown an induction motor 10 that is conventional in design and which embodies the mechanical features of the present invention. Although the invention is described with reference to an induction type motor, the invention is not necessarily limited to this particular type of machine and it may be used in conjunction with any rotating machine utilizing a stator and a rotor for providing an electrical link between the mechanical components of the system. It should be further noted that for purposes of this disclosure it is immaterial to the invention if the machine operates on either direct or alternating current.

Machine 10 includes a motor housing 11 having a generally circular inner wall 12 to which is secured, by any conventional means, a stator assembly 13 which includes a series of wire coils 14 carried within slots 15. A rotor assembly, generally referenced 16, is also mounted within the housing and is adapted to turn within the stator assembly. The rotor assembly includes a typical induction type motor frame 17 containing a plurality of squirrel cage bars 18. As best seen in FIG. 2, a pair of output shafts 20, 21 are aligned along the central axis of the machine and are rotatably supported therein by means of bearings 23, and 24 that are press fitted into the motor casing 25. Shaft 21, which is herein referred to as the low speed shaft, is secured by any suitable means to a rear locking disc 27, the purpose of which will be explained in greater detail below. One end of the second high speed shaft 20 is rotatably supported within a bearing 28 that is housed in hub 29 formed in the end face of the rear disc 27.

The rotor frame 17, which is cylindrical in form, has a ring gear 30 formed or otherwise generated in the inner wall thereof. Alternatively, the ring gear may be formed as an independent element that may be affixed to the frame by any suitable means. A sun gear 31, having an axial length substantially equal to the ring gear, is keyed to the shaft 20 via key 33 to position the sun gear in axial alignment with the ring gear. A series of four equally spaced planet gears 35—35 are placed in meshing engagement with both the sun gear and the ring gear to provide a planetary gear system that is completely contained within the confines of the rotor assembly. The planet gears are all of identical construction and form a cluster that helps to maintain the rotor assembly centered in regard to the rotational axis of the machine. To further insure that the rotor assembly will turn symmetrically about the axis of the machine, one or both ends of the rotor frame may be extended in an axial direction beyond the rotor windings and the extended section 37 supported in alignment within the casing by means of one or more bearings 38. Although four planet gears are utilized in the present embodiment of the invention, it should be understood that this number may be increased or decreased without departing from the teachings of the present invention.

Figure 3:
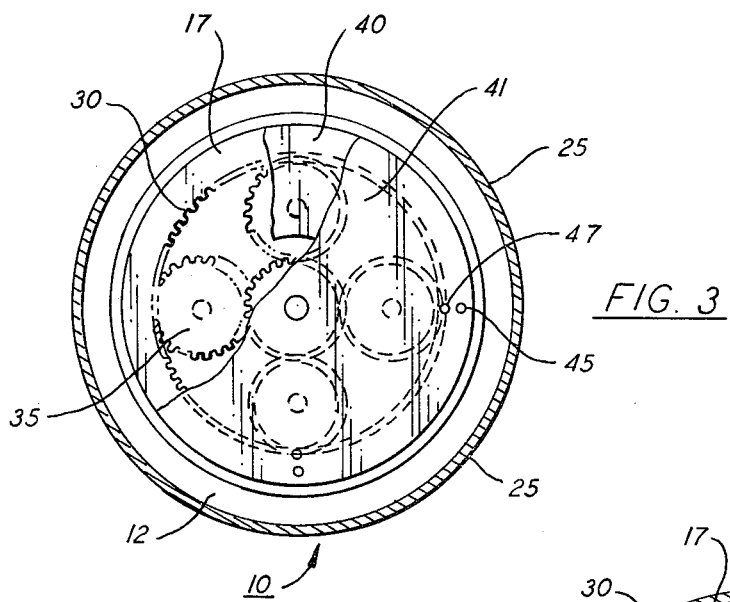
FIGS. 3-5 are sections taken as indicated in FIG. 2 illustrating means for locking various gear components of the system against rotation.
Figure 4:
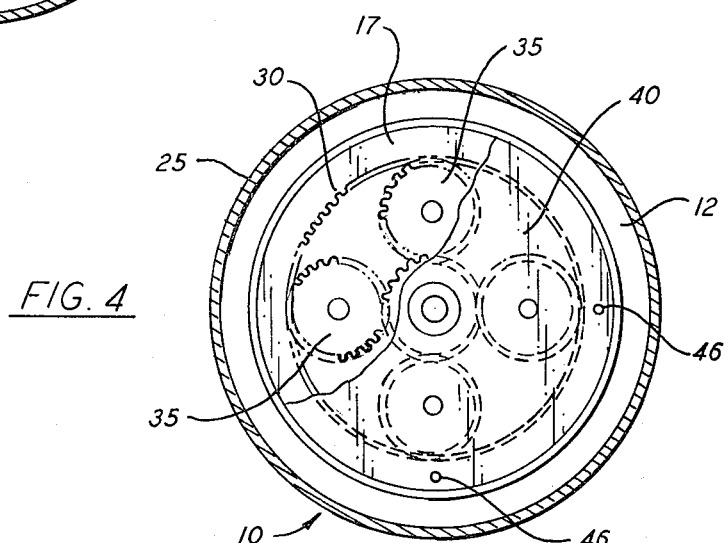
Figure 5:
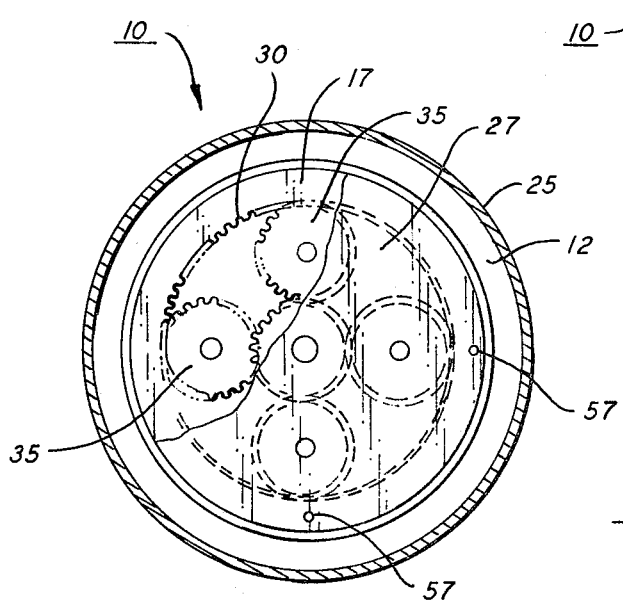

With further reference of FIGS. 3-5, a series of locking discs are herein provided to enable the user to select a number of different output speeds at the two shafts. As will be disclosed in further detail below, speeds equal to, above or below the normal rotor speed may be selected whereby the motor may be adapted for various uses. The locking discs include the above noted rear disc 27 and two superimposed discs located at the high speed shaft end of the machine. These discs include an inner disc 40 journalled to shaft 20 and an outer disc 41 that is keyed to shaft 20 by key 53. Two series of equally spaced holes 45, 46 are formed about the outer periphery of each of the two superimposed discs with both series of holes being located on identical pitch circles. An inner series of equally spaced holes 47 is also provided in outer disc 42 with the holes being arranged so that they may be brought into coaxial alignment with holes 48 formed in the machine casing. By this arrangement the outer disc 41 can be selectively located to the stationary machine casing by inserting pin 50 into holes 47 and 48. Similarly, discs 40 and 41 may be locked together by passing a second pin 51 into aligned holes 45 and 46. Although not shown, a door may be formed in the end wall of the motor casing to provide sufficient access to carry out the pinning operation.

In assembly, outer disc 41 is secured to shaft 20 by means of key 53 and the shaft, in turn, is keyed to the sun gear 31. The inner disc 40 is securely affixed to equally spaced shafts 55—55 upon which the planet gears 35—35 are rotatably supported. Each planet shaft passes through the associated gears and is affixed at the other end to the rear disc 27 by any suitable means. Although not shown, the planet gears are rotatably had on shafts 55—55 by means of spring washers of the like, in alignment with the sun and ring gears. The rear disc 27 again is provided with a series of circumferentially spaced holes 57 that are arranged to be brought into coaxial alignment with stationary holes 58 formed in the machine casing. Here again, the disc can be selectively locked to the motor casing by inserting a pin 59 into the aligned holes.

In operation, where low speed, high torque performance is required, locking pin 50 is mounted within holes 47 and 48, causing the sun gear to be locked to the casing. As a result, high speed output shaft 20 is held motionless and the low speed output shaft 21 is caused to turn with the planet gear cluster as it moves about the sun gear. In this arrangement, the planet cluster is turned by the ring gear at a relatively lower speed than the normal motor speed and this reduced speed is in turn imparted to the shaft 21 through means of the disc 27. The percentage of speed reduction that is attained is a function of the selected gear ratios and, in practice, can be set at any one of a wide number of values.

To provide for a high speed, low torque, output, pin 50 is removed and pin 59 inserted between the casing and rear disc 27. This, in turn, frees the high speed shaft 20 and renders the low speed shaft 21 immobile. Correspondingly, shafts 55—55 of the planet cluster are now locked in a non-rotating posture within the gear system. The fixed planet gears now act as intermediate gears in the system to transmit the ring gear motion to the sun gear. Again, depending on the gear ratios involves, the sun gear is caused to turn at higher than motor speed and its motion is applied directly to high speed shaft 20.

In order to translate the rotor speed directly to either of the output shafts 20, 21, pins 50 and 59 are removed from the system and the two superimposed discs 40, 41 are locked together via pin 51. Shaft 20 is now tied directly to the rotor frame. As disc 27 is locked to disc 40 through planet gear shafts 55—55, the low speed output shaft 21 also becomes locked to the rotor frame, thereby causing both shafts to turn at the same speed as the rotor.

Figure 6:
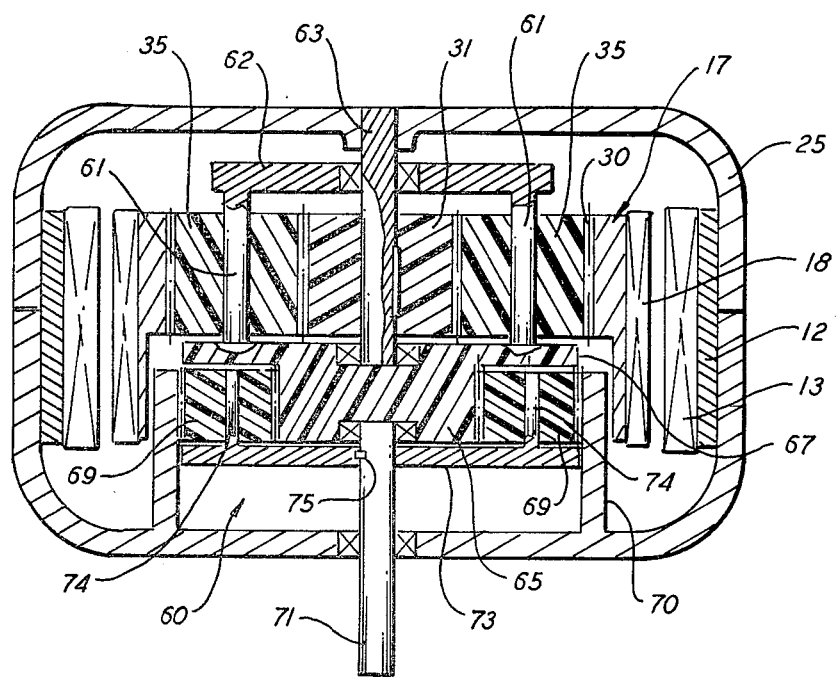
FIG. 6 is another embodiment of the invention that illustrates a dual planetary gear system mounted within the rotor structure of an electric motor.

Turning now to FIG. 6, there is shown a second embodiment of the invention wherein like components as noted above are identified by like numerals. As is the primary embodiment, the rotor frame 17 is provided with a ring gear 30 which, in turn, is capable of translating rotational motion to a sun gear 31 through a plurality of planet gears 35—35. A secondary planetary gear system, generally referenced 60, is provided to deliver a greater reduction in motor speed. To accomodate the secondary planetary system within the rotor structure, the axial length of each of the gears in the primary system is reduced to about one-half or less of the axial length of the rotor frame and the secondary system is housed in the space thus provided.

In this second embodiment of the invention, the primary planet gear shafts 61—61 are secured to a disc 62 rotatably supported upon stub shaft 63. Shaft 63, in this embodiment, does not provide a source of output power but merely serves to support the primary planetary gear system in assembly. One end of the shaft is anchored in the motor casing 25 while the other end is rotatably supported in the sun gear 65 of the secondary planetary system. In practice, the rotor, acting through the ring gear 30, causes the primary planet gear cluster to turn about sun gear 31 when the motor is in operation.

The shafts 61—61 associated with the primary planet gears are also affixed by any suitable means to a radially extended section 67 of secondary sun gear 64 whereupon the sun gear is caused to turn at the same reduced speed as the primary cluster. The secondary planet gear cluster 69—69 is arranged to mesh with both the sun gear 65 and a fixed ring gear 70. In the instant embodiment of the invention, the ring gear 70 depends inwardly from one wall of the motor casing and is formed as an integral part thereof. As the secondary gear cluster is being driven by the sun gear about the fixed ring gear, a second or further reduction in motor speed is attained by the turning cluster. This reduced speed is brought to the output shaft 71 of the system via a drive disc 73 that is affixed to the secondary planet gear shafts 74—74 and is keyed to the shaft by key 75.

As is well known in the art, a relatively large reduction in motor speed can be achieved through the use of dual planetary gear transmission arrangement. It should be further evident, that this highly desirous result is herein accomplished without wasting valuable space or impairing the operational performance of the motor.

Figure 7:
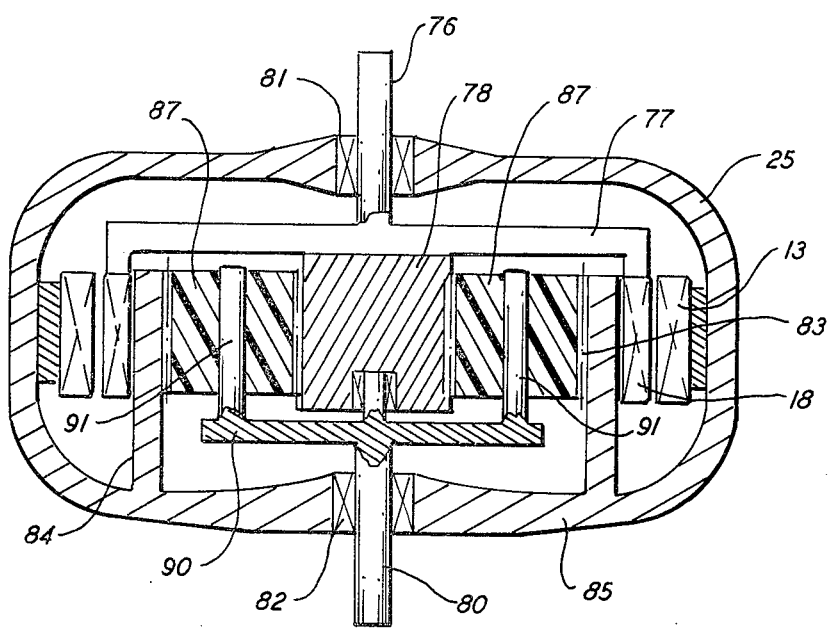
FIG. 7 is a still further embodiment of the invention illustrating a simplified planetary gear system.

Turning now to FIG. 7, there is shown a simplified embodiment of the system set forth in FIG. 2. Here again, the stator 13 is affixed to a machine casing 25 and is adapted to co-act electrically with rotor 18 to produce some fixed rotational speed. In this particular arrangement, the rotor is affixed directly to a high speed output shaft 76 via connector arm 77. The arm, in turn, is secured by any suitable means to the sun gear 78 of a planetary gear system employed to turn a second low speed output shaft 80. The two shafts 76 and 80 are journalled for rotation in the machine casing by means of bearings 81 and 82, respectively.

Ring gear 83 of the planetary drive system is formed within the inner wall of a circular member 84 depending inwardly from the side wall 85 of the motor casing. In assembly, the dependent member 84 is housed within the rotor structure and sufficient clearance is provided therebetween to allow the rotor to freely turn about the member. A plurality of planet gears 87—87 are adapted to mesh with the sun and ring gears and thereby supply a cluster that is rotatably driven by the sun gear. Here again, the outer periphery of a drive disc 90 is secured to the extended end of each planet shafts 91 whereby the disc is caused to turn at the same speed as the cluster. The center of the disc is also secured to the low speed output shaft 80.

As can be seen, by holding the ring gear of the system fixed and driving the planet cluster through the sun gear in the manner described, it produces a substantial reduction in speed at the output shaft 80. Accordingly, in this simplified embodiment of the invention, two different output speeds are attained at the expense of a minimum amount of space and parts.

The planet and sun gears used in the present invention may be fabricated of Teflon or any other suitable low-friction material that is capable of turning at relatively high speeds without producing appreciable noise. Similarly, the planetary systems can be designed to furnish any number of output speeds by the proper selection of gear ratios and driving arrangements without departing from the teachings of the invention. While the invention has been described with specific reference to the details as set forth above, it is not necessarily confined to the structure as disclosed and this application is intended to cover any modifications or changes as may come within the scope of the following claims.

I claim:

1. An electric motor having stationary stator windings secured to the motor casing and rotor windings supported within the stator windings for rotation about the axis of the motor, the motor further including
   an internal ring gear formed as an integeral part of the rotor windings whereby the ring gear turns with said rotor windings,
   a main drive shaft rotatably supported within the casing along the axis of the motor,
   a sun gear secured to the main shaft for rotation therewith within the ring gear, and
   a planetary gear cluster mounted in meshing engagement with the sun gear and the ring gear whereby the shaft is driven directly through the gears by the rotor windings.

2. The motor of claim 1 that further includes an auxiliary shaft also rotatably supported in the casing in coaxial alignment with the main shaft and a rigid member connecting the planetary gear cluster to said auxiliary shaft whereby said auxiliary shaft is capable of turning at the same speed as said planetary gear cluster.

3. The motor of claim 2 that further includes a locking means for selectively locking said planetary gear cluster and said auxiliary shaft.

4. The motor of claim 3 that further includes a first disc and a second disc axially aligned upon said main shaft, said first disc being rotatably supported upon said main shaft and being secured to the planetary gear cluster for rotation therewith, said second disc being keyed to said main shaft, and pinning means for selectively securing the first disc to the second disc and said second disc to the casing.

* * * * *

UNITED STATES PATENT AND TRADEMARK OFFICE
CERTIFICATE OF CORRECTION

PATENT NO. : 4,274,023

DATED : June 16, 1981

INVENTOR(S) : DONALD F. LAMPREY

It is certified that error appears in the above—identified patent and that said Letters Patent is hereby corrected as shown below:

Col. 3, line 21, "42" should be -- 41 --; line 24, "located" should be -- locked --;

Col. 4, line 39, "64" should be -- 65 --;

Col. 6, claim 3, line 26, after "said" the following should be inserted -- rigid member to the casing to prevent rotation of said --.

Signed and Sealed this

Eighth Day of September 1981

[SEAL]

Attest:

Attesting Officer

GERALD J. MOSSINGHOFF

Commissioner of Patents and Trademarks